(12) United States Patent
Payne et al.

(10) Patent No.: US 6,704,331 B2
(45) Date of Patent: Mar. 9, 2004

(54) SYNTHETIC GUIDE STAR GENERATION

(75) Inventors: Stephen A. Payne, Castro Valley, CA (US); Ralph H. Page, Castro Valley, CA (US); Christopher A. Ebbers, Livermore, CA (US); Raymond J. Beach, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 308 days.

(21) Appl. No.: 09/833,403

(22) Filed: Apr. 11, 2001

(65) Prior Publication Data

US 2002/0148942 A1 Oct. 17, 2002

(51) Int. Cl.$^7$ ................................................. H01S 3/00
(52) U.S. Cl. ................................ 372/6; 372/21; 372/31
(58) Field of Search ............................ 372/21, 6, 31, 372/18; 359/333, 341; 250/201.9

(56) References Cited

U.S. PATENT DOCUMENTS

| | | | | |
|---|---|---|---|---|
| 5,008,887 A | * | 4/1991 | Kafka et al. | 372/6 |
| 5,412,200 A | * | 5/1995 | Rhoads | 250/201.9 |
| 5,448,053 A | * | 9/1995 | Rhoads | 250/201.9 |
| 5,513,194 A | * | 4/1996 | Tamura et al. | 372/6 |
| 5,815,307 A | * | 9/1998 | Arbore et al. | 359/328 |
| 5,832,006 A | * | 11/1998 | Rice et al. | 372/3 |
| 6,061,170 A | * | 5/2000 | Rice et al. | 359/345 |
| 6,084,227 A | * | 7/2000 | Rhoads | 250/201.9 |
| 6,118,575 A | * | 9/2000 | Grubb et al. | 359/337 |
| 6,278,100 B1 | * | 8/2001 | Friedman et al. | 250/201.9 |

* cited by examiner

*Primary Examiner*—Paul Ip
*Assistant Examiner*—Dung Nguyen
(74) *Attorney, Agent, or Firm*—Eddie E. Scott; Alan H. Thompson

(57) ABSTRACT

A system for assisting in observing a celestial object and providing synthetic guide star generation. A lasing system provides radiation at a frequency at or near 938 nm and radiation at a frequency at or near 1583 nm. The lasing system includes a fiber laser operating between 880 nm and 960 nm and a fiber laser operating between 1524 nm and 1650 nm. A frequency-conversion system mixes the radiation and generates light at a frequency at or near 589 nm. A system directs the light at a frequency at or near 589 nm toward the celestial object and provides synthetic guide star generation.

22 Claims, 4 Drawing Sheets

SYNTHETIC GUIDE STAR GENERATION

The United States Government has rights in this invention pursuant to Contract No. W-7405-ENG-48 between the United States Department of Energy and the University of California for the operation of Lawrence Livermore National Laboratory.

BACKGROUND OF THE INVENTION

Field of Endeavor

The present invention relates to synthetic guide stars and more particularly to laser guide star generation.

State of Technology

Earth-bound astronomers have long sought to diminish the effects of the atmosphere on their observations. Stars that appear as sharp pinpricks to the eye become smeared "blobs" by the time they are imaged by large ground-based telescopes.

At the University of California's Lick Observatory on Mount Hamilton near San Jose, Calif., Laboratory researchers and their UC colleagues are installing a system on the 3-m Shane telescope that will correct these troublesome distortions. The system includes a dye laser that will create a "guide star" in the upper atmosphere and very sensitive adaptive optics that will measure and correct for atmospheric distortions. According to Scot Olivier, project scientist for the adaptive optics subsystem, the Shane is the first major astronomical telescope with such a laser system. Other groups have been using adaptive optics systems with natural guide stars. However, it turns out that not just any star will do. It must be bright enough; that is, generate enough light to serve as a reference. When observing at visible wavelengths, astronomers using adaptive optics require a fifth-magnitude star, one that is just bright enough to be seen unaided. For near-infrared observations, only a tenth-magnitude star is needed, which is 100 times fainter.

The problem, Olivier noted, is that even though there may be hundreds of thousands or even a million stars bright enough to be guide stars, they only cover a small fraction of the sky. "Many times, there just isn't a natural guide star in the area you want to observe," he said. "This is the kind of situation where a telescope equipped with a laser guide star comes out ahead."

Definition: Laser Guide Star—A man-made, star-like laser light source that permits an optical system (telescope) to be adjusted to cancel out the adverse effects of viewing through turbulent atmosphere. By detecting backscattered light from a laser beam fired upwards, computers and adaptive optics can compensate for the distorting effects of atmospheric turbulence on astronomical images.

Some rudimentary wavefront correction systems, which don't require lasers, are based on a mirror, which can be tilted in real-time in response to the wandering of the star image about a centroid. These minute deflections originate from the atmosphere acting like a giant prism, which varies over time bending the wavefront as a whole. It is much more difficult for such passive systems to adequately correct for higher order aberrations which change the shape of the point spread function due to multiple inhomogeneities in the atmospheric index of refraction along the light path. Laser guide star systems can offer an elegant solution to this problem by actively rather than passively sensing these inhomogeneities. There are many prototype laser guide star systems currently in operation or in the testing phase such as the Lick Observatory system. Most are based on correcting the incoming optical wavefront using a laser to probe the index of refraction variations of the atmosphere along the path. With this knowledge, computers and high speed deformable or tiltable mirrors can be used to reverse these wavefront distortions.

Laser guide star efforts have generally focused on two methods of creating artificial stars. The first method uses visible or ultraviolet light to reflect off air molecules in the lower atmosphere from fluctuations (Rayleigh scattering), creating a star at an altitude of about 10 km. The other method uses yellow laser light to excite sodium atoms at about 90 km. The sodium-layer laser guide star turns out to be crucial for astronomy, because astronomers need large telescopes to see objects that are very far away and therefore very dim. These large telescopes require the laser guide star to be as high as possible so that the light from the laser star and the observed object pass through the same part of the atmosphere. With a guide star at the lower elevation, the system senses and corrects for only about half of the atmosphere affecting the light from a distant object.

U.S. Pat. No. 5,412,200 for a method and apparatus for wide field distortion-compensated imaging by Geoffrey B. Rhoads, patented May 2, 1995, provide the following information beginning at column 2, line 59: "Just as adaptive optics systems have recently employed "artificial beacons" to assist in the imaging of very dim objects, so too can this invention utilize various forms of this concept as described herein. Artificial beacons can be employed when the brightness of an object under study is insufficient or inappropriate to provide photons to a wavefront sensor. The beacons are generally laser beams directed along a close line of sight to the object, generating backscatter photons which will undergo largely similar phase distortions as the photons from the object under study, and thus they can be used to deduce the phase distortions applicable to the object photons."

U.S. Pat. No. 5,448,053 for a method and apparatus for wide field distortion-compensated imaging by Geoffrey B. Rhoads, patented Sep. 5, 1995, provides the following abstract: "An imaging system for measuring the field variance of distorted light waves collects a set of short exposure "distorted" images of an object, and applies a field variant data processing methodology in the digital domain, resulting in an image estimate which approaches the diffraction limited resolution of the underlying physical imaging system as if the distorting mechanism were not present. By explicitly quantifying and compensating for the field variance of the distorting media, arbitrarily wide fields can be imaged, well beyond the prior art limits imposed by isoplanatism. The preferred embodiment comprehensively eliminates the blurring effects of the atmosphere for ground based telescopes, removing a serious limitation that has plagued the use of telescopes since the time of Newton."

U.S. Pat. No. 6,084,227 for a method and apparatus for wide field distortion-compensated imaging by Geoffrey B. Rhoads, patented Jul. 4, 2000, provide the following information beginning at column 1, line 15: "The limitations on imaging system performance imposed by a turbulent media, most simply described as 'blurring,' are well known, particularly in applications using medium to large aperture telescopes in the open atmosphere. These limitations have not only led to a variety of system solutions that will be discussed as prior art, but have played a major role in the decision to launch space based telescopes and have led to serious postulations of lunar based observatories. For a large aperture telescope—generally greater than a 10 centimeter diameter for the visible light region—which is otherwise constructed to a precision commonly referred to as "near diffraction limited," the overall ability to resolve objects obscured by a turbulent atmosphere is limited by the turbulence rather than by the instrument. For the visual band of light once more, it is quite typical for a 1 meter aperture telescope to have ten times worse resolving power due to the turbulence, while a 10 meter aperture telescope can be 100 times or more worse than its innate "diffraction limit." The exact numbers for any given telescope on any given night are a function of many variables, but this general level of degradation is widely recognized. As importantly, this atmospheric blurring directly leads to a loss in effective sensitivity of these large aperture imaging systems, which either renders dim objects just too dim to be seen or forces greatly extended exposure times, ultimately limiting the number of objects that can be imaged during a given length of usage time. The prior art for addressing this problem and trying to alleviate it can be generally categorized into the following well known areas: 1) Telescope Placement; 2) Adaptive Optics Systems; and 3) Speckle Inferometric Systems."

SUMMARY OF THE INVENTION

The present invention provides a system for assisting in observing a celestial object and providing synthetic guide star generation. The system includes a lasing system, a frequency-conversion system serving to mix the radiation and generate light at a separate frequency, and a system for directing the light toward the celestial object and providing synthetic guide star generation. The lasing system provides radiation at a frequency at or near 938 nm and radiation at a frequency at or near 1583 nm. A frequency-conversion system mixes the radiation at a frequency at or near 938 nm and the radiation at a frequency at or near 1583 nm and generates light at a frequency at or near 589 nm. A system directs the light at a frequency at or near 589 nm toward the celestial object and enables synthetic guide star generation. Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
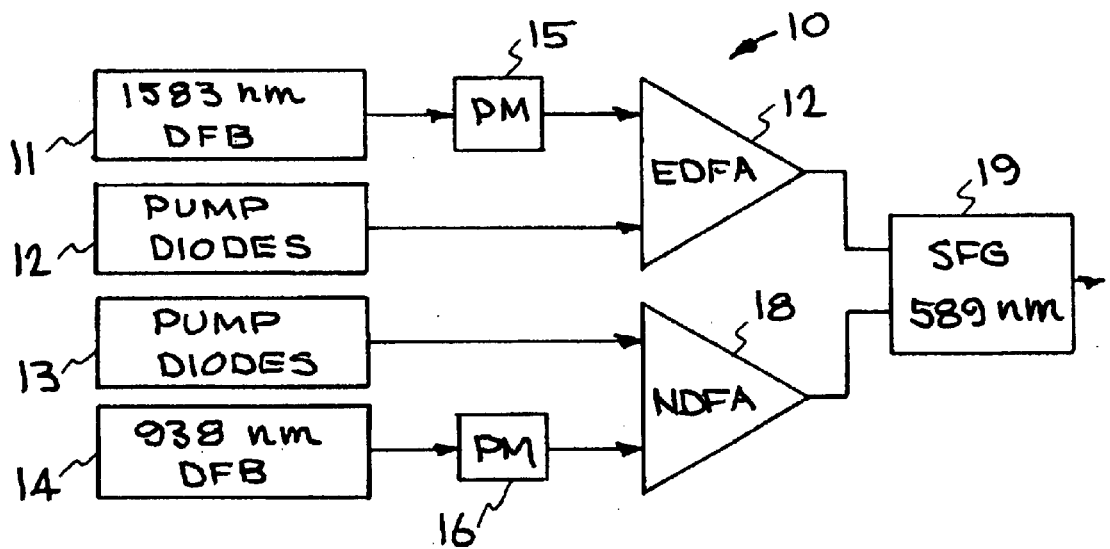
FIG. 1 illustrates the general architecture for the cw all-fiber laser guide star.

Referring now to the drawings, specific embodiments of the invention are shown. The detailed description of the specific embodiments, together with the general description of the invention, serve to explain the principles of the invention.

Synthetic guide stars can be produced by optical excitation of atoms contained in the mesosphere at an altitude of approximately 90 km. The generation of brightly-fluorescent guide stars for adaptive optics requires precise control of the laser frequency and bandwidth to maximize the return signal. Several laser technologies were investigated to generate 589 nm sodium D-line light for laser guide star applications. The sodium-laser embodiment of the present invention uses two fiber lasers operating at or near 938 nm and at or near 1583 nm, respectively. Very stable fiber oscillators followed by high-average-power double-clad fiber amplifiers are used to generate the frequency-stable cw output powers required for the nonlinear wave-mixing process. The output radiation from these two fiber lasers is then wave-mixed in a nonlinear crystal such as Periodically Poled Lithium Niobate (PPLN), Lithium Tantalate (PPLT), or Potassium Titanyl Phosphate (PPKTD) to generate an output at 589 nm. The resulting systems are simple, robust, efficient, and reliable, making them ideal for use in remote astronomical observatories. Similar fiber-laser technology generates the 765 nm light used for potassium resonance excitation, and for 570 nm bichromatic (with 589 nm) sodium excitation.

The present invention provides a new architecture for constructing laser guide stars, used to correct for atmospheric distortions with adaptive optics. These guide stars are based on fluorescence emitted from atoms resonantly pumped to excited states. The best-known example is 589 nm excitation of sodium. Other examples are, 765 nm excitation of potassium and multiple-color pumping (e.g., sequential absorption of 589 and 570 nm photons by sodium atoms).

The main approaches pursued in the past for pumping sodium include (1) dye lasers, and (2) frequency-mixed Nd:YAG lasers. Dye lasers generate the desired 589 nm wavelength directly using a MOPA architecture (master oscillator—power amplifier). It is therefore possible to amplify, the seed from an oscillator in a manner tailored to optimize the spectrum of the output beam (20 Watts at 2 GHz bandwidth for 10–100 nsec pulsed operation). Their disadvantages include potentially-flammable solvents, need for pumping and cooling cycles, and relatively-inefficient (<0.1%) operation.

At this time the bulk-solid-state-laser approach appears more compelling, since its efficiency is higher (–0.5%), it can probably be more compact, and flammable liquids are eliminated. In the original vision developed at MIT, 1064 nm and 1319 run beams were frequency-mixed to generate the desired 589 run wavelength. Nevertheless, very careful optical design is required to manage the substantial thermal aberrations expected in this type of laser, and such a system will probably require the maintenance services of a laser expert.

The present invention is based on the use of fiber pump lasers. Fiber lasers perform far more effectively when operating in the continuous wave (CW) mode than when generating pulses. To enable efficient frequency conversion of these CW lasers, the present invention relies on the benefits from recent advances in "quasi-phase-matched" nonlinear-optical crystals, based on periodic poling. The present invention uses these new crystals to achieve high conversion efficiency via single pass mixing. Resonant buildup cavities will not be required.

Fiber lasers have been developed as a new generation of compact, inexpensive and robust light sources. In essence, a fiber laser is an optically-pumped doped-fiber serving as the gain medium. As the gain exceeds the total optical loss in the resonator, a laser oscillation can be generated or an input seed input can be amplified. Many different dopants can be used to achieve laser oscillations at different wavelengths. Atomic transitions in rare-earth ions can be used to produce lasers from visible wavelengths to mid infrared wavelengths. Mode-locked fiber lasers can use various cavity is configurations such as linear, ring, and figure-eight geometries. See, for example, U.S. Pat. No. 5,008,887 to Kafka, et al. and U.S. Pat. No. 5,513,194 to Tamura et al which are incorporated herein by reference.

The general architecture for the cw all-fiber laser guide star is shown in FIG. 1. The general architecture includes: DFB ("distributed feedback") oscillators, Phase modulators, Cladding-pumped fiber amplifiers, and Quasi-phase-matched (PPLN, PPLT, PPKTP, etc.) sum-frequency-converters. The DFB oscillators determine the operating wavelengths of the pump lasers, which have been selected as 938 run for the Nd: $SiO_2$ fiber and 1583 nm for the Er:$SiO_2$ fiber. Since the fibers will each need to generate about 20 Watts, bandwidth must be added to the seed lasers to reduce the tendency for Stimulated Brillouin Backscatter (SBS). Using the formula to estimate the SBS threshold in Watts:

$$P_{crit}=21(A_{eff}/g_oL)(1+\Delta V_{nu·lase}/\Delta V_{Br}),$$

where the mode radius is taken as 5 microns, the Brillouin gain coefficient is $g_0=5\times10^{-11}$ m/W, the laser and Brillouin bandwidths are taken as $\Delta V=500$ MHz and $\Delta V_{Br}=17$ MHz respectively, and fiber length is 10 meters (half the actual physical length to account for the growing amplitude of the intensity). We calculate the critical power for Brillouin scattering is $P_{crit}=100$ Watts. Considering the requirements relating to the guide star, we note that a bandwidth of ~500 MHz also has a favorable impact on the luminescence from the sodium layer, since it avoids saturation of the sodium atoms in the atmosphere. The fortuitous coincidence of the bandwidth requirements imposed by the fiber amplifiers and of the sodium layer saturation, enables the functionality of the current invention. Use of larger fiber core diameter and shorter fiber length would increase the power margin further. So, it is plausible to obtain 20 Watts of cw fiber laser power without interference from SBS losses, while meeting the guide star requirements for the atmospheric sodium layer.

FIG. 1 shows the components of the cw all-fiber laser guide star. The overall system is generally designated by the reference numeral 10. The lasing system includes a Nd-doped fiber pump fiber laser operating near a frequency of 938 nm. The Nd-doped fiber pump fiber laser is composed of pump diodes 13, distributed feedback oscillator (DFB) 14, phase modulator (PM) 16, and Nd doped fiber amplifier (NDFA) 18. The Erbium-doped fiber pump fiber laser is composed of pump diodes 12, distributed feedback oscillator (DFB) 11, phase modulator (PM) 15, and Erbium doped fiber amplifier (EDFA) 17. The lasing system provides radiation at a frequency near 938 nm and radiation at a frequency near 1583 nm. The Nd doped fiber amplifier (NDFA) 18 and Erbium doped fiber amplifier (EDFA) 17 provide the radiation to sum frequency generation (SFG) frequency-conversion system 19. The frequency-conversion system 19 mixes the radiation at a frequency near 938 nm and the radiation at a frequency near 1583 nm and generates light at a frequency near 589 nm. The frequency-conversion system 19 uses periodically poled frequency-conversion crystals (such as PPLN).

The desired wavelength of 589 nm can be generated by many pairs of wavelengths, that are available within the gain bandwidth of EDFA and NDFA fiber amplifiers. For example, stable pairs of wavelengths are: 1530.0 nm and 957 nm; 1550.0 nm and 950.0 nm; 1570.0 nm and 942.6 nm; 1590.0 nm and 935.6 nm; and 1610.0 nm and 928.7 nm. The recommended wavelength pair of 1583 nm and 938 nm provides desired performance at 589 nm.

Figure 2:
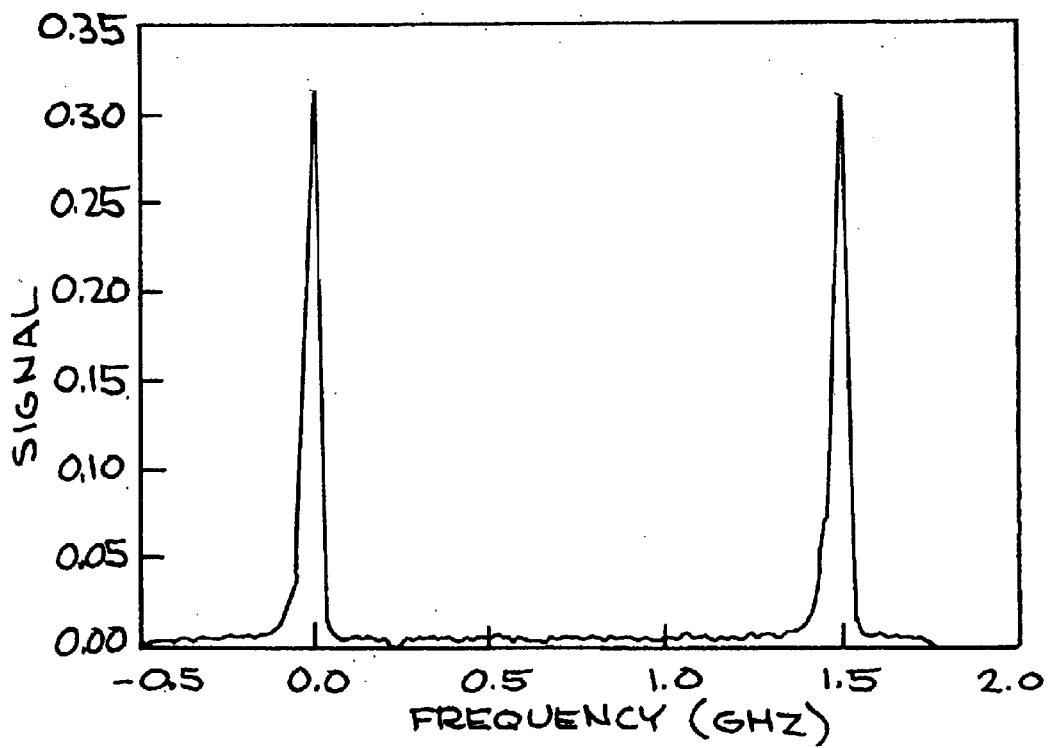
FIG. 2 shows an etalon trace of the low-power frequency-mixed output near the guide-star wavelength.

DFB fiber oscillators have proven extremely stable, even without any wavelength-control feedback. An etalon trace of the low-power frequency-mixed output near the guide-star wavelength is shown in FIG. 2 and is stable over several minutes without any type of feedback loop. In this case, the DFB oscillator has a linewidth of <<50 MHz (instrument limited). Fiber-pigtailed phase modulators are standard components, readily procured with the necessary operating wavelength, RF frequency, and depth of modulation. Also shown in FIG. 2 is the usual pattern of side-band frequencies imposed on the oscillator output by the FM modulator.

Both of the fiber amplifiers employ cladding-pumped structures to produce adequate output power. Cladding-pumped structures will be applied to the 20 Watt 1583 nm Er:fiber. Fifteen (15) Watt modules are already on sale from IRE Polus (operating at 1555 nm). While 1583 nm is about halfway down the $Er^{3+}$ gain curve, sufficient flexibility in the amplifier design exists to achieve the desired output power. Furthermore, one of the strongest new directions (continuing the trend toward greater bandwidth) in the telecom industry is operation in the so-called long-wave region (L-band) of erbium-doped fiber amplifiers. $Er^{3+}$ is normally codoped with $Yb^{3+}$ to enhance the pumping efficiency and minimize the quasi-three-level losses. It is possible to maintain linear polarization of the fiber amplifier if its temperature is stabilized and it is firmly mounted to a fixture. Polarization-maintaining Er:fibers are being developed.

Figure 3:
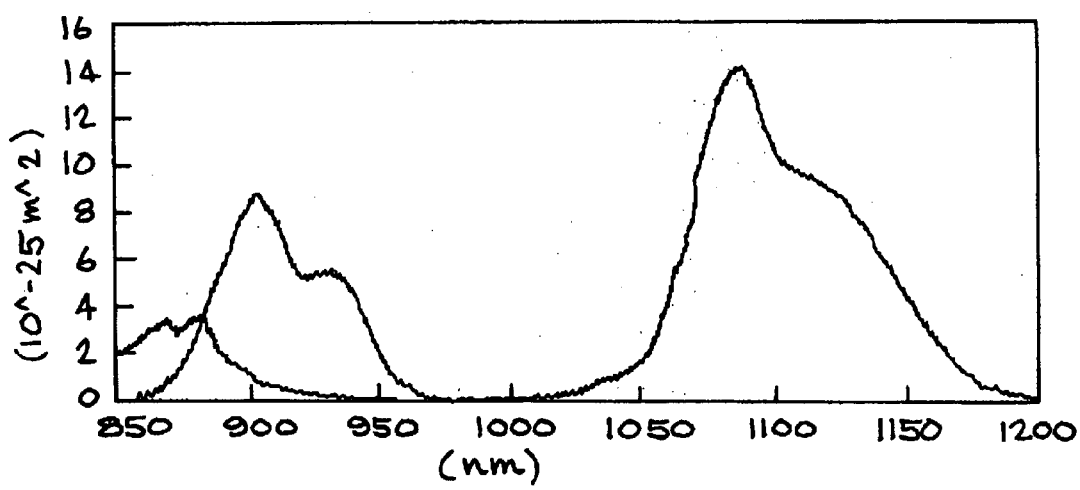
FIG. 3 shows absorption and emission cross-section spectra of Nd:SiO$_2$ fiber, using germania in the core rather than alumina.

The 938 nm Nd:silica fiber is a somewhat more novel device, since the $Nd^{3+}$ ions must operate on the resonance transition (i.e. $^4F_{3/2}-^4I_{9/2}$), while suppressing ASE losses at the more-conventional 1080 nm transition. The absorption and emission of the relevant transitions appears in FIG. 3. Although the 1080 nm transition is the common operating mode of the laser, there have been several papers in which lasing at 900–945 nm was reported [for example, see A. Cook & H. Hendricks, Diode-laser-pumped tunable 896–939.5-nm neodymium-doped fiber laser with 43-mw output power, Applied Optics 37, 3276–328 (1998). An important finding is that an alumina-free fiber core (using germania instead to raise the refractive index) assures that the $Nd^{3+}$ ions have the optimal emission spectrum, favoring resonance-band operation.

Figure 4:
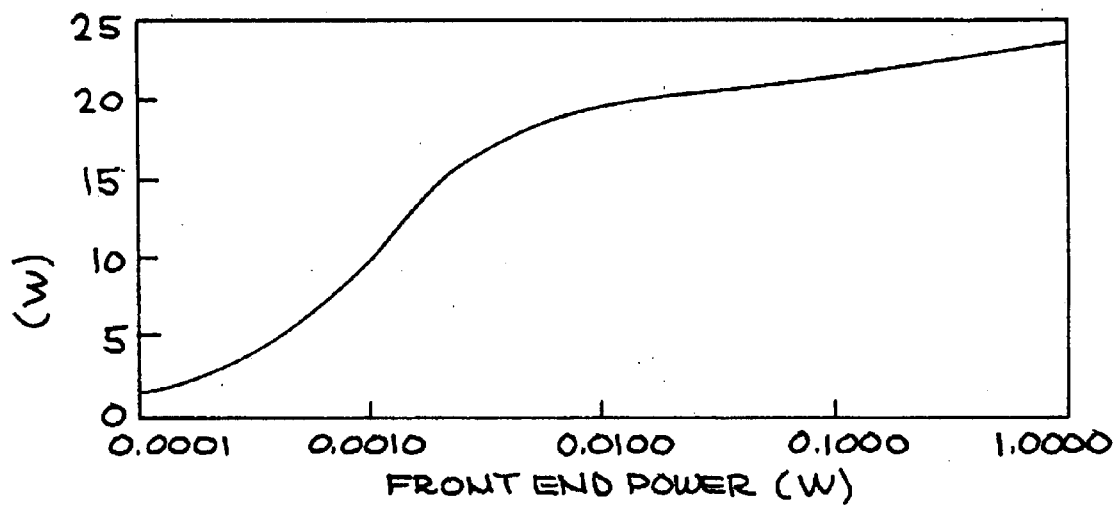
FIG. 4 shows output power of Nd:fiber as a function of seed power assuming 1080 nm ASE is suppressed.

In FIG. 4, the calculated output power of a Nd:silica fiber resonance amplifier (938 nm) is plotted as a function of the front-end input signal power. For this design (60 Watts of pump power, $10^{20}$ cm$^{-3}$ Nd doping, 250 $\mu$m inner [pump] cladding dimension, and 20 meters of fiber) will meet the 20-Watt goal. An issue for this type of fiber amplifier is self-saturation from 1080 nm ASE. With 100 mW of 938 nm input signal power, the 1080 nm gain is driven down to 57 dB, larger than the 40 dB practical limit. The 1080 nm ASE can be suppressed by separating the fiber into two catenated lower-gain segments with an intermediate dichroic filter to reject the 1080 nm radiation. Or, chirped long-period fiber Bragg gratings can direct the ASE from the core into the cladding, where there is greatly reduced gain because of poor overlap with the core. Another possibility is to systematically bend the fiber, since the bend losses are normally greater at longer wavelengths, thereby selectively reducing the gain at 1080 nm compared to 938 nm. See, for example, U.S. Pat. No. 6,118,575 which is incorporated herein by reference.

In another embodiment the fiber is cooled. This entails cooling the fiber to below ambient, perhaps to 100K, so that the ground state absorption at 938 nm is greatly reduced, essentially approximately equalizing the gain at 938 nm and 1080 nm.

Frequency conversion efficiency is dependent upon the magnitude of the nonlinear optical coefficient, the length of the crystal, and the square of the incident intensity. Traditionally, frequency conversion of CW laser sources is accomplished using external cavity techniques—resonantly enhancing the incident light at a cost of precisely monitoring and controlling the length of the optical cavity (also known as cavity locking). Periodically-poled crystals, and in particular PPLN (Periodically Poled Lithium Niobate), allow efficient frequency conversion through a 30× increase (over the nonlinear coupling of crystals such as LBO) in the magnitude of the nonlinear optical coefficient. With this tremendous increase in the nonlinear optical coupling, it is now possible to frequency-convert CW laser light in a single pass without the use of the external cavity. A CW single pass conversion efficiency exceeding 42% at an average power of 2 W has been demonstrated in PPLN. In addition, 6 Watts of second-harmonic power was produced with an Yb:silica fiber using periodically-poled KTP (purchased from Isorad). This result is within a factor of two of the guide-star requirements. Other periodically poled materials offering very promising performance are PPLT (LiTaO$_3$), as well as Mg-doped and stoichiometric LiNbO$_3$ and LiTaO$_3$, and periodically-poled KTP.

Figure 5:
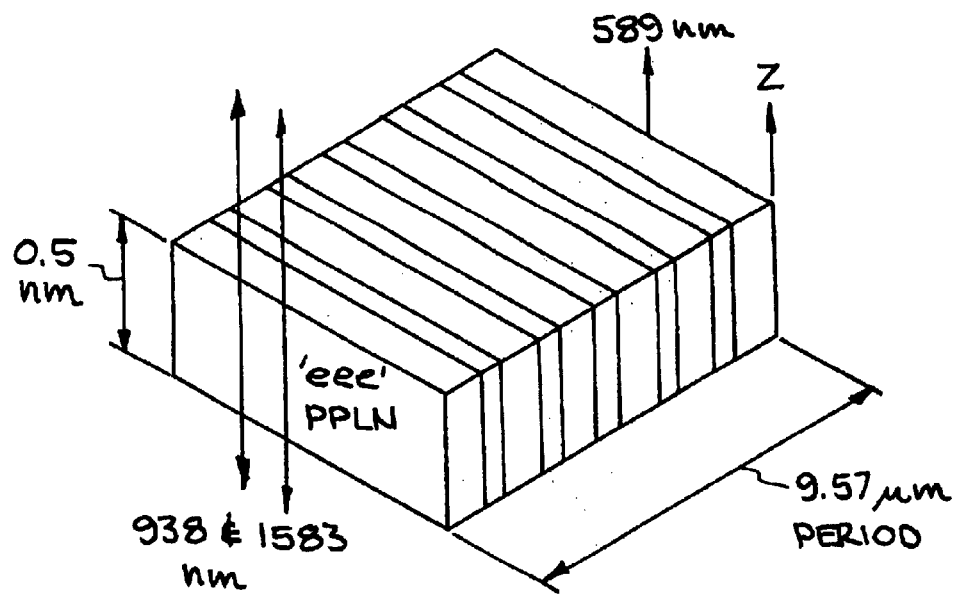
FIG. 5 shows depiction of periodically-poled frequency conversion crystal.
Figure 6:
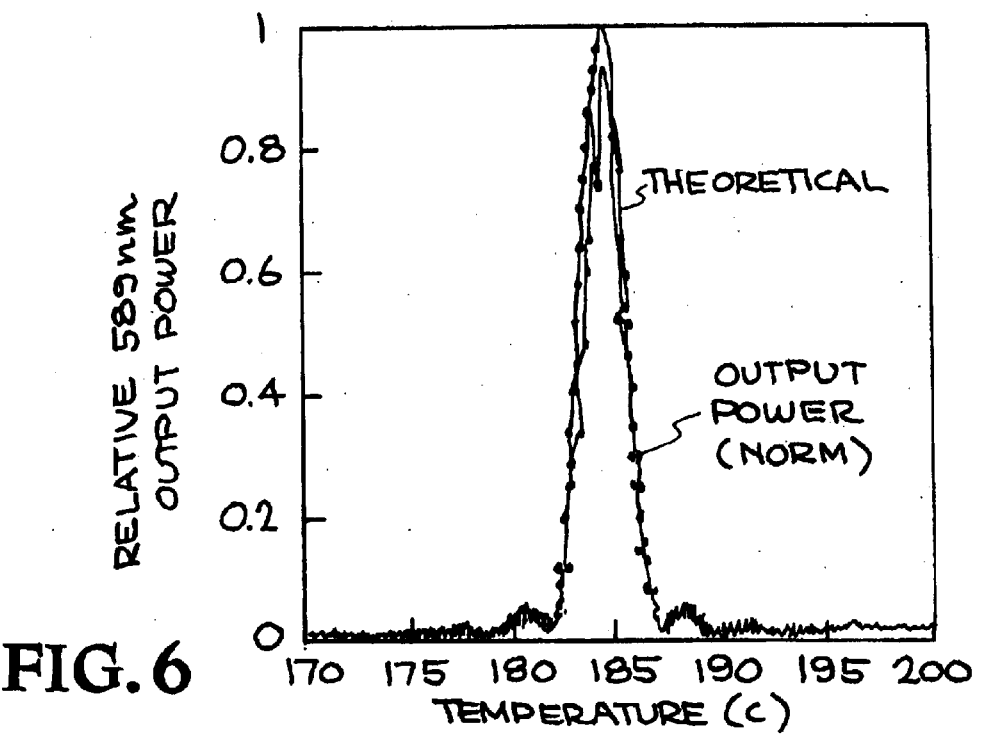
FIG. 6 shows a plot of the 589 nm light output as a function of temperature of the periodically-poled frequency conversion crystal.

FIG. 5 shows depiction of periodically-poled frequency conversion crystal and FIG. 6 shows a plot of the 589 nm light output as a function of temperature. FIG. 5 schematically depicts a periodically-poled material (PPLN in this example.) With 938 nm and 1583 nm light being summed to 589 nm using LiNbO$_3$, the poling period must be 9.57 $\mu$m. Results utilizing PPLN have been successful. We include for illustration, the temperature-tuned 589 nm output power achieved by mixing 1319 nm and 1064 nm light in a PPLN crystal with 8.9 $\mu$m period (for about 100 mW of output.) The expected sinc-squared dependence on the temperature detuning is evidence of the high uniformity (needed for good mixing efficiency) in the poling period and in the oven temperature.

Figure 7:
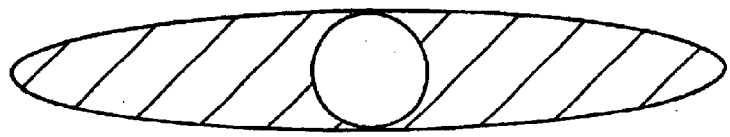
FIG. 7 shows a simple diagram of anomorphic focus represented as a means of scaling the power by about a factor of five.

Another challenge to using this new class of periodically poled crystals is increasing their average power handling capabilities. Although improved materials will be able to handle 10 Watts of 589 nm output, in an embodiment we use anamorphic focussing as an alternative approach to the necessary power scaling. Our strategy is to employ a simple circular beam unless power handling becomes a problem, requiring an elliptical focus. The issue is that the crystals can typically be poled at thickness up to ~1 mm, resulting in very high intensities if round spots of such diameters are used. Our resolution is to expand the focal spot in the crystal up to a 5× aspect ratio, as pictured in FIG. 7.

A 100 mW 589 nm system has been built based on mixing relatively low power 1064 nm and 1319 nm light. The system is comprised of a NPRO single-frequency laser from Lightwave Electronics and an Yb:silica fiber (together with a modulator). Although this system offers less power (by about two orders of magnitude) than the guide-star requirements (since it was only intended to serve as a front-end laser), many of the basic physics issues were resolved in the course of its construction.

Figure 8:
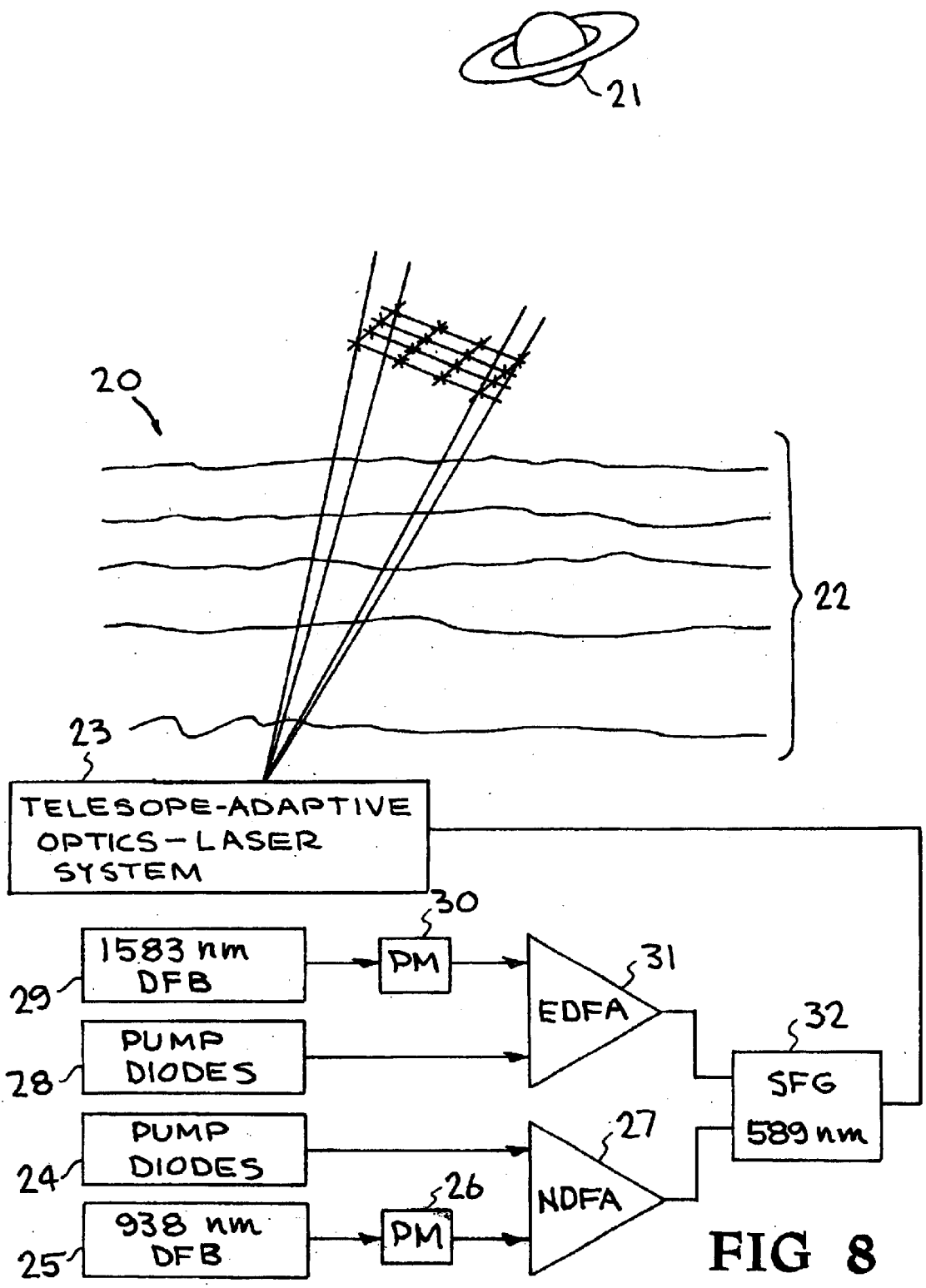
FIG. 8 illustrates the lasing system, the frequency-conversion system serving to mix the radiation and generate light at a separate frequency, and the system for directing the light toward the celestial object and providing synthetic guide star generation.

FIG. 8 illustrates the present invention of a synthetic laser guide star used to correct for atmospheric distortions with adaptive optics. A celestial object 21 is observed by a telescope through an atmosphere 22. The synthetic laser guide star system, designated generally by the reference numeral 20, includes a telescope-adaptive optics-laser system 23. The system 23 includes a telescope, adaptive optics, and a laser system based on fluorescence emitted from atoms resonantly pumped to excited states. The laser light for the system 23 is provided by a lasing system and a frequency-conversion system serving to mix the radiation and generate light at a separate frequency.

Adaptive optics requires a reference source of light in the sky to measure wavefront aberration introduced by atmospheric turbulence. Natural stars are ideal for this purpose, but the density of bright stars is not sufficient to provide complete sky coverage. The problem can be overcome with an artificial beacon generated from resonant backscattering off mesospheric sodium atoms exited by a low-power laser. U.S. Pat. No. 5,412,200 for a method and apparatus for wide field distortion-compensated imaging by Geoffrey B. Rhoads, patented May 2, 1995, incorporate herein by reference, states "Just as adaptive optics systems have recently employed "artificial beacons" to assist in the imaging of very dim objects, so too can this invention utilize various forms of this concept as described herein. Artificial beacons can be employed when the brightness of an object under study is insufficient or inappropriate to provide photons to a wavefront sensor. The beacons are generally laser beams directed along a close line of sight to the object, generating backscatter photons which will undergo largely similar phase distortions as the photons from the object under study, and thus they can be used to deduce the phase distortions applicable to the object photons."

The synthetic guide star 20 is produced by optical excitation of atoms contained in the mesosphere 22 at an altitude of approximately 90 km. The optical excitation of atoms generates sodium D-line light at or near 589 nm for laser guide star application. The sodium-laser embodiment of the present invention uses two fiber lasers operating at or near 938 nm and at or near 1583 nm, respectively. The frequency-conversion system 32 mixes the radiation at a frequency at or near 938 nm and the radiation at a frequency at or near 1583 nm and generates light at a frequency at or near 589 nm.

The lasing system includes a Nd-doped fiber pump fiber laser operating at or near a frequency of 938 nm. The Nd-doped fiber pump fiber laser is composed of pump diodes 24, distributed feedback oscillator (DFB) 25, phase modulator (PM) 26, and Nd doped fiber amplifier (NDFA)

27. The Erbium-doped fiber pump fiber laser is composed of pump diodes 28, distributed feedback oscillator (DFB) 29, phase modulator (PM) 30, and Erbium doped fiber amplifier (EDFA) 31. The lasing system provides radiation at a frequency at or near 938 nm and radiation at a frequency at or near 1583 nm. The Nd doped fiber amplifier (NDFA) 27 and Erbium doped fiber amplifier (EDFA) 31 provide the radiation to sum frequency generation (SFG) frequency-conversion system 32. The frequency-conversion system 32 mixes the radiation at a frequency at or near 938 nm and the radiation at a frequency at or near 1583 nm and generates light at a frequency at or near 589 nm. The light is directed to the telescope-adaptive optics-laser system 23. The synthetic guide star 20 is used to correct for atmospheric distortions. The telescope-adaptive optics-laser system 23 provides a reference source of light in the sky to measure wavefront aberration introduced by atmospheric turbulence.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A laser apparatus for assisting in observing a celestial object using synthetic guide star generation, comprising:

a lasing system providing radiation, said lasing system including a first fiber laser having a Nd-doped fiber amplifier operating to produce amplified radiation between 880 nm and 960 nm and a second fiber laser having an Er-doped amplifier operating to produce amplified radiation between 1524 nm and 1650 nm, a frequency-conversion system serving to mix said amplified radiation and generate light at a frequency near 589 nm, and a system for directing said light at a frequency at or near 589 nm toward said celestial object and providing synthetic guide star generation.

2. The laser apparatus for assisting in observing a celestial object using synthetic guide star generation of claim 1 wherein said fiber laser having a Nd-doped fiber amplifier operating to produce amplified radiation at a frequency at or near 938 nm and a fiber laser operating at or near 1583 nm includes a distributed feedback oscillator.

3. The laser apparatus for assisting in observing a celestial object using synthetic guide star generation of claim 1 wherein said fiber laser having an Er-doped amplifier operating to produce amplified radiation at or near a frequency of 938 nm and a Er-doped fiber pump fiber laser operating at or near a frequency of 1583 nm includes a distributed feedback oscillator.

4. The laser apparatus for assisting in observing a celestial object using synthetic guide star generation of claim 1 wherein said fiber laser having a Nd-doped fiber amplifier operating to produce amplified radiation at or near a frequency of 938 nm includes a distributed feedback oscillator and said fiber laser having a Er-doped fiber amplifier operating to produce amplified radiation at or near a frequency of 1583 nm includes a distributed feedback oscillator.

5. The laser apparatus for assisting in observing a celestial object using synthetic guide star generation of claim 1 wherein said Nd-doped fiber amplifier operating to produce amplified radiation at or near a frequency of 938 nm and said Er-doped fiber amplifier operating to produce amplified radiation at or near a frequency of 1583 nm are seeded with DFB oscillators.

6. The laser apparatus for assisting in observing a celestial object using synthetic guide star generation of claim 1 wherein said lasing system includes means for providing near 10W of output power.

7. The laser apparatus for assisting in observing a celestial object using synthetic guide star generation of claim 1 wherein said lasing system includes means for producing a continuous wave.

8. The laser apparatus for assisting in observing a celestial object using synthetic guide star generation of claim 1 wherein said lasing system includes means for providing about 0.5 GHz of spectral bandwidth.

9. The laser apparatus for assisting in observing a celestial object using synthetic guide star generation of claim 1 including means for periodically pulsing said frequency-conversion system.

10. The laser apparatus for assisting in observing a celestial object using synthetic guide star generation of claim 1 wherein said frequency-conversion system is selected from periodically-poled PPLN, PPLT, and KTP.

11. The laser apparatus for assisting in observing a celestial object using synthetic guide star generation of claim 1 wherein said lasing system employs cladding pump fiber structure.

12. The laser apparatus for assisting in observing a celestial object using synthetic guide star generation of claim 1 wherein said lasing system includes means for operating below 200K.

13. The laser apparatus for assisting in observing a celestial object using synthetic guide star generation of claim 1 wherein said lasing system includes means for operating at below room temperature.

14. The laser apparatus for assisting in observing a celestial object using synthetic guide star generation of claim 1 wherein said lasing system includes two fiber lasers or amplifiers operating near 920 nm to 960 nm and near 1530 nm to 1620 nm.

15. The laser apparatus for assisting in observing a celestial object using synthetic guide star generation of claim 1 wherein said frequency-conversion system includes means for generating light at a frequency between 570 nm and 590 nm.

16. A method of assisting in observing a celestial object using synthetic guide star generation, comprising the steps of:

providing amplified radiation using a first fiber laser operating between 880 nm and 960 nm, providing amplified radiation using a second fiber laser operating between 1524 nm and 1650 nm, mixing said amplified radiation and generating light at a frequency at or near 589 nm, and directing said light at the frequency at or near 589 nm toward said celestial object and providing synthetic guide star generation.

17. The method of assisting in observing a celestial object using synthetic guide star generation of claim 16 wherein said step of providing amplified radiation using a fiber laser operating between 880 nm and 960 nm comprises operating said fiber laser to provide radiation at a frequency at or near 938 nm and said step of providing amplified radiation using a fiber laser operating between 1524 nm and 1650 nm comprises operating said fiber laser to provide amplified radiation at a frequency at or near 1583 nm.

18. The method of assisting in observing a celestial object using synthetic guide star generation of claim 16 wherein said step of providing amplified radiation using a fiber laser operating between 880 nm and 960 nm is accomplished using a Nd-doped fiber pump fiber laser and said step of providing amplified radiation using a fiber laser operating between 1524 nm and 1650 nm is accomplished using a Er-doped fiber pump fiber laser.

19. The method of assisting in observing a celestial object using synthetic guide star generation of claim 16 wherein said step of providing amplified radiation using a fiber laser operating between 880 nm and 960 nm is accomplished using a Nd-doped fiber amplifier and said Nd-doped fiber amplifier is seeded with a DFB oscillator and said step of providing amplified radiation using a fiber laser operating between 1524 nm and 1650 nm is accomplished using a Er-doped fiber amplifier operating at or near a frequency of 1583 nm and said Er-doped fiber amplifier is seeded with a DFB oscillator.

20. The method of assisting in observing a celestial object using synthetic guide star generation of claim 16 including the step of periodically pulsing said light generated at a frequency at or near 589 nm.

21. The method of assisting in observing a celestial object using synthetic guide star generation of claim 16 wherein said steps of providing amplified radiation using a fiber laser operating between 880 nm and 960 nm and providing amplified radiation using a fiber laser operating between 1524 nm and 1650 nm are conducted at a temperature below 200k.

22. The method of assisting in observing a celestial object using synthetic guide star generation of claim 16 wherein said steps of providing amplified radiation using a fiber laser operating between 880 nm and 960 nm and providing amplified radiation using a fiber laser operating between 1524 nm and 1650 nm are conducted at below room temperature.

* * * * *